United States Patent
Wood

[15] 3,635,640
[45] Jan. 18, 1972

[54] APPARATUS FOR STRETCHING SHEET MATERIAL

[72] Inventor: Edward C. Wood, Portola Valley, Calif.
[73] Assignee: The Sierracin Corporation, Sylmar, Calif.
[22] Filed: Oct. 17, 1968
[21] Appl. No.: 768,245

[52] U.S. Cl..............................425/445, 26/62 B, 38/102.5, 269/111, 264/289
[51] Int. Cl.........................B29c 17/02, D06c 3/08
[58] Field of Search.................18/1 FS, 1 FM, 1 FB, 19 R, 18/DIG. 48, DIG. 53; 264/289; 26/51, 54, 61 B, 62 B; 38/102.4, 102.5; 269/111, 119

[56] References Cited

UNITED STATES PATENTS

| | | | |
|---|---|---|---|
| 2,759,217 | 8/1956 | Peterson | 18/1 FS |
| 2,912,716 | 11/1959 | Frownfelter et al. | 18/1 FS |
| 2,918,696 | 12/1959 | Bottoms et al. | 18/1 FS X |
| 2,968,065 | 1/1961 | Gronholz | 18/DIG. 53 |
| 3,078,516 | 2/1963 | Trammell, Jr. et al. | 18/DIG. 53 |
| 3,287,765 | 11/1966 | Puente | 18/DIG. 53 |
| 3,466,706 | 9/1969 | Asano | 18/DIG. 53 |

FOREIGN PATENTS OR APPLICATIONS

| | | | |
|---|---|---|---|
| 125,670 | 8/1960 | U.S.S.R. | 18/1 FS |
| 1,102,526 | 3/1955 | France | 18/1 FS |

Primary Examiner—Robert L. Spicer, Jr.
Attorney—Christie, Parker & Hale

[57] ABSTRACT

A sheet material stretching arrangement having a plurality of clamps holding the sheet, wherein the clamps are spaced and shaped so as to achieve substantially maximum recovery of usable stretched material. By the use of properly spaced, elongated clamping surfaces, of the order of 85 percent of the stretched material may be substantially undistorted and usable.

10 Claims, 12 Drawing Figures

PATENTED JAN 18 1972
3,635,640
SHEET 1 OF 2
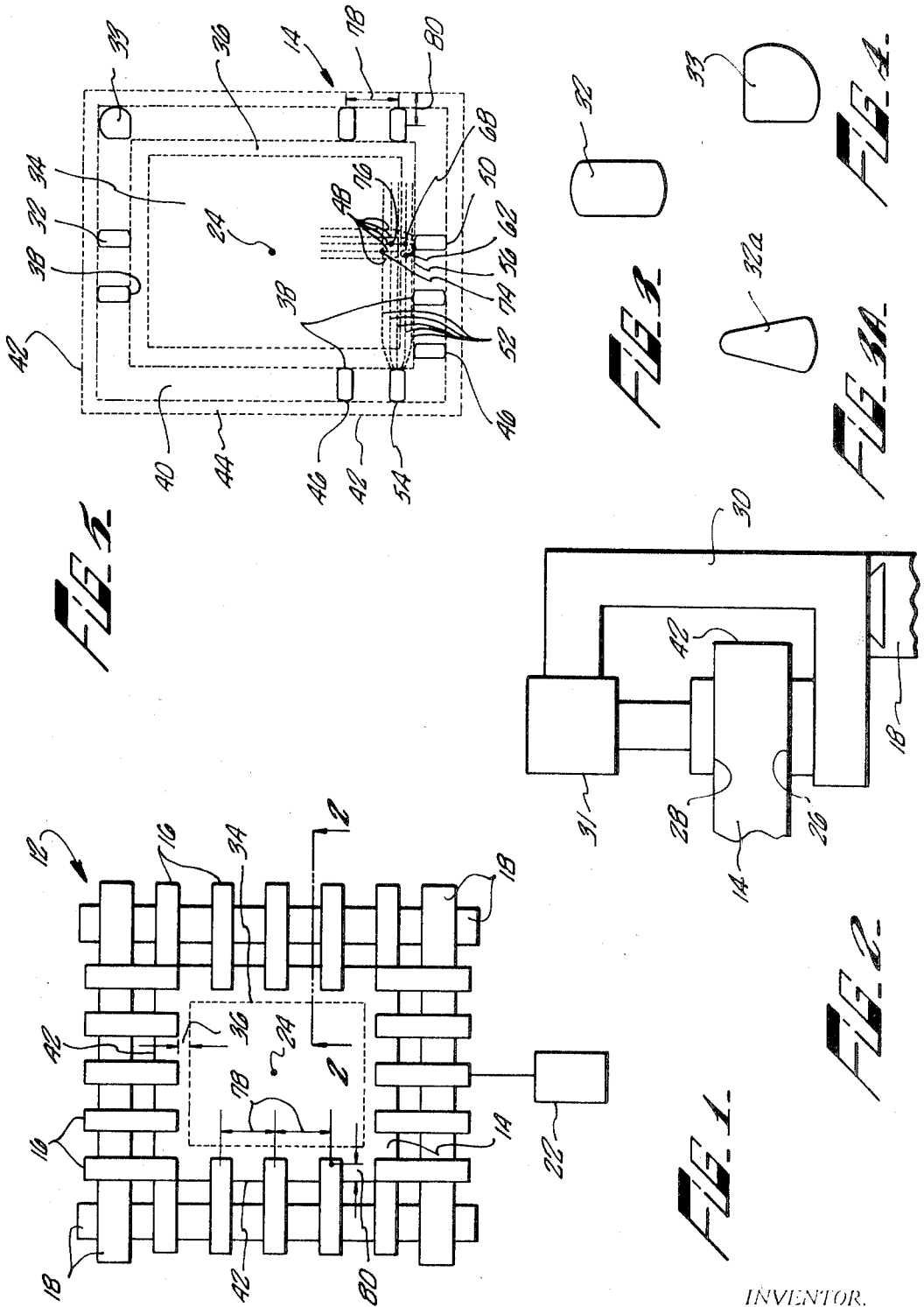
INVENTOR.
EDWARD C. WOOD
BY
Christie, Parker & Hale
ATTORNEYS

APPARATUS FOR STRETCHING SHEET MATERIAL

BACKGROUND OF THE INVENTION

1. Field of the Invention

This invention relates to arrangements and methods for holding and gripping sheet material that is to be stretched. Although this invention is adapted for use in stretching any kind of sheet material, it is particularly well suited for stretching plastic sheets such as transparent, thermoplastic acrylic sheets.

Application Ser. No. 168,368 filed concurrently herein, is directed to a stretching machine in which the holding and gripping arrangement of the present application may be employed.

2. State of the Prior Art

Various types of machines have been developed to stretch sheet material so as to improve its physical properties. These machines require clamps for gripping the sheet while it is being stretched.

Large forces are usually required to perform the stretching operation. When a plastic, such as acrylic, is stretched, it is usually heated. The clamps are forced against the sheet and partially into it in order to provide the required gripping action. In some machines the gripping locations are heated during the stretching operation. The portions of the sheet which have been engaged by the clamps are unusable. Also, portions of the sheet which are adjacent the clamps are unusable because they do not have uniform characteristics due to stress concentrations and, in some machines, due to the localized heating at the gripping locations.

The unusable portions or the waste of the sheet when stretched with presently known stretching machines ranges as high as 60 percent of the total area of the sheet. It is noteworthy that in even the most advanced stretching machines the amount of waste material has not been decreased. Instead the machines are constructed for optimal utilization of stretching forces, space requirements and, where applicable, of heat-transfers to the sheet to maintain it to an elevated temperature while it is being stretched. The amount of waste from portions of the sheet which are damaged by the holding devices and from intermediate portions which are optically unsatisfactory has been accepted as unavoidable.

The relatively large percentage of waste when stretching sheet material on machines constructed in accordance with the prior art contributes heavily to the expense of stretched sheet material and of the finished products manufactured therefrom.

SUMMARY OF THE INVENTION

In accordance with the present invention the sheet to be stretched is held and gripped by clamps arranged near the edges of the sheet and spaced and shaped to provide substantially maximum recovery of the stretched material. It has been found that acrylic sheets have satisfactory characteristics in areas closer to the center of the sheet than a line located toward the center a distance from the clamps equal to about 0.6 of the spacing between the clamps.

Maximum yield of usable stretched material is achieved by reducing the spacing between the clamps. The clamping surfaces or pads which contact the sheet to be stretched are arranged and shaped to minimize the stress concentration.

In a preferred embodiment, the material to be stretched is gripped at locations which are spaced apart a sufficient distance at the outset to prevent rupturing of the material during the stretching operation but not more than the distance required to provide a stress factor of less than 0.35 over approximately 80 percent of the total area of the sheet of material.

Stretching in accordance with the present invention insures an optically usable portion of the stretched sheet which is as high as 85 percent of the total sheet area. The waste has been reduced from one-half to one-third of that of the prior art stretching machines.

BRIEF DESCRIPTION OF THE DRAWINGS

FIG. 1 is a schematic plan view of a machine for stretching sheet material;

FIG. 2 is a fragmentary, enlarged, side elevational view, in section, taken along lines 2—2 of FIG. 1;

FIGS. 3 and 3A show two preferred shapes for the gripping portion of the clamps that are located along the working beams;

FIG. 4 shows the shape of the gripping portion of the clamps that are employed in the corners between the working beams;

FIG. 5 is a plan view of a stretched sheet and showing the usable and unusable portions of it;

DESCRIPTION OF THE PREFERRED EMBODIMENTS

Figure 11:
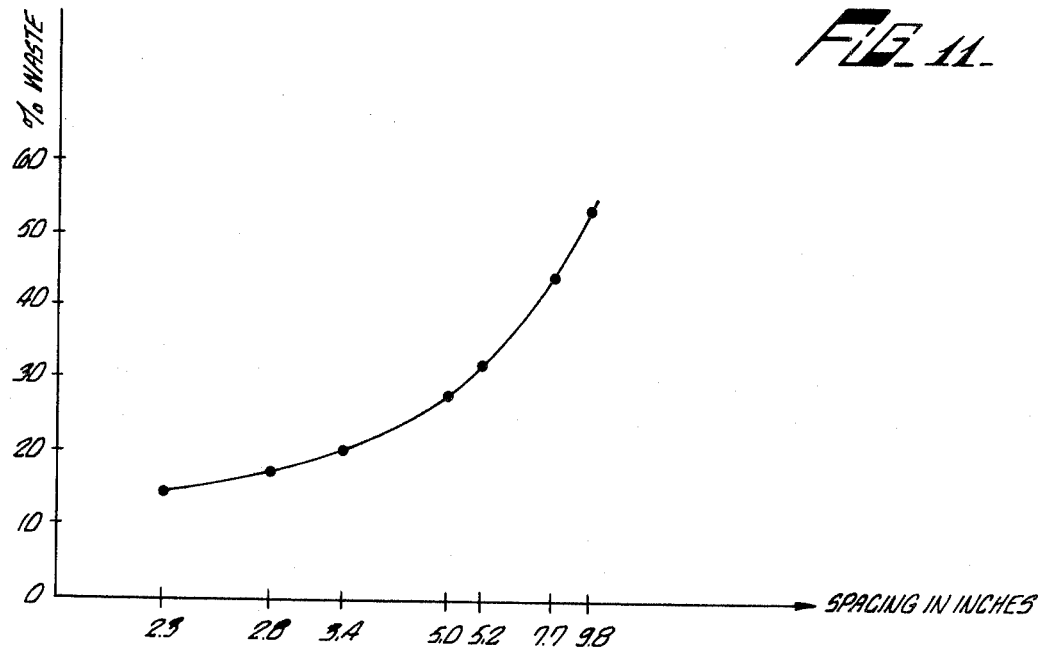
FIG. 11 is a diagram showing the relationship between the spacing of adjacent clamps and the percentage of waste after the sheet has been stretched.

FIG. 1 schematically illustrates a stretching machine 12 for stretching a sheet 14 of material in perpendicular directions. The sheet 14 may be a transparent sheet of plastic, such as acrylic. The as-cast sheets are brittle, have a low tensile strength and are easily cracked. By uniformly stretching a preheated sheet in a plane in two directions, it is subjected to plane stresses which reduce its brittleness and toughen it. The sheet should be heated to a rubbery condition, such as by heating in an oven prior to the stretching operation.

A plurality of clamps 16 are arranged in banks or beams 18. The beams are moved by actuator means 22 to enlarge the space which they enclose, so as to perform the stretching action. This may be done in accordance with the arrangement disclosed in the aforesaid application Ser. No. 768,368, or it may be done in accordance with prior art techniques which move all four beams away from the center 24 of the sheet.

Referring to FIG. 2, each clamp includes a lower gripping portion 26 and an upper gripping portion 28, and is mounted on a beam 18. The clamps are free to move in a direction parallel to that beam. This may be achieved by mechanical linkages as disclosed in copending application Ser. No. 768,368, or by prior art arrangements. Each clamp includes a member 30 which mounts the lower gripping portion 26, and actuating means, such as an hydraulic actuator 31, which moves the upper gripping portion 28 into engagement with the plastic sheet 14 and applies a holding force to the sheet. The gripping portion or pads for the clamps should be shaped and spaced so that the ratio of free space to the distance between the centers of the respective pads is not less than 0.55 along any line disposed parallel to the edge of the sheet and passing under the pads. In a preferred embodiment, the gripping portion or pads for the clamps are elongated along the direction that force is to be applied to stretch the sheet, as illustrated by the pads 32 or 32a of FIGS. 3 and 3A, and the gripping pads for the corner clamps are pie-shaped, as illustrated by pad 33 of FIG. 4. The corner clamps and pads 33 are arranged so as to apply forces to the sheet along perpendicular directions so that the corners will be subjected to the stretching action along with the rest of the sheet. The corner clamps are connected to and apply force from the two beams which define the respective corners, as illustrated in FIG. 1. Stress concentrations are minimized by this clamping arrangement so as to achieve maximum yield of usable stretched material. Additional heat is not required at the gripping locations, thereby simplifying the clamps.

During the stretching operation, the sheet is subjected to deformation which is not uniform throughout. The sheet can be divided into four imaginary zones, shown in FIG. 5. The first zone 34 extends about the center 24 toward the gripping portions of the clamps and defines a usable area wherein the sides of the sheet are parallel to each other and optically flat. It is therefore desired to maintain that zone as large as possible to reduce and minimize all other parts of the stretched sheet which must be discarded.

A second zone 36 is immediately adjacent the first zone 34 and is a strip extending along adjacent inner sides 38 of the gripping portions 26 and 28 of the clamps and the outer end of zone 34. In this area the sides of the sheet are neither parallel nor flat. There exist optical distortions which make this zone unusable.

A third zone or strip 40 has a width equal to the length of the gripping portions in a direction transverse to an adjacent periphery of edge 42 of the sheet. A fourth zone 44 is between an outer end 46 of the clamps and the adjacent periphery of the sheet.

The sheet must be pulled uniformly in perpendicular directions to assure uniform thinning and flat, optically satisfactory, parallel sides. Uniformity or homogeneity of the deformation of the sheet is achieved when stresses in any unitary cross section of the sheet are equal to those of any other. The originally flat and parallel surfaces of the sheet remain parallel and the stretched sheet is free of optical distortions.

The stretching forces are inhomogeneous in the third zone 40 since they are concentrated in the areas of the gripping portions 26 and 28 of the clamps 16. In the vicinity of each clamp in a direction towards the center 24, that is the second zone 36, the stresses in the sheet from the stretching forces of the clamps are different in each cross section of the sheet. This difference becomes successively smaller with an increase in the distance from the gripping portion of the clamp. In other words, the stretching forces are concentrated adjacent the inner edges 38 of the clamps and become more equally distributed in portions of the sheet which are further removed from the clamps. The stresses tend to equalize until, in the first zone 34, they are so nearly equal that the sheet elongates uniformly for practical and optical purposes. They may therefore be considered homogeneous even though mathematically they only approach it.

In FIG. 5, lines 48 illustrate the flow of the forces exerted by a clamp 50 and how they equalize from the clamp toward the center portion 34. A similar force distribution is illustrated by lines 52 which correspond to stretching forces from another clamp 54 which acts perpendicular to clamp 50. They too become nearly equal at the borderline between the first and second zones 34 and 36.

To illustrate the aforementioned effects to the clamp spacing, the stresses in particular cross sections in the second zone 36 of the sheet are first more closely examined. A point 56 is in an area where the forces from clamp 50 as well as the stresses induced by them are negligible. The stresses at it point induced by forces from clamp 54 are much greater. This is illustrated graphically in FIG. 6 wherein arrows 58 represent the stresses from the forces exerted by clamp 54 and arrows 60 represent the stresses from forces exerted by clamp 50. Due to the difference in the magnitude of the stresses the deformation of the sheet in the vicinity of point 56 is inhomogeneous. The sheet elongates more in the direction of force lines 52 than in the direction of force lines 48. As a result, the surface of the sheet becomes uneven and optically distortive.

Figures 6, 7, 8:
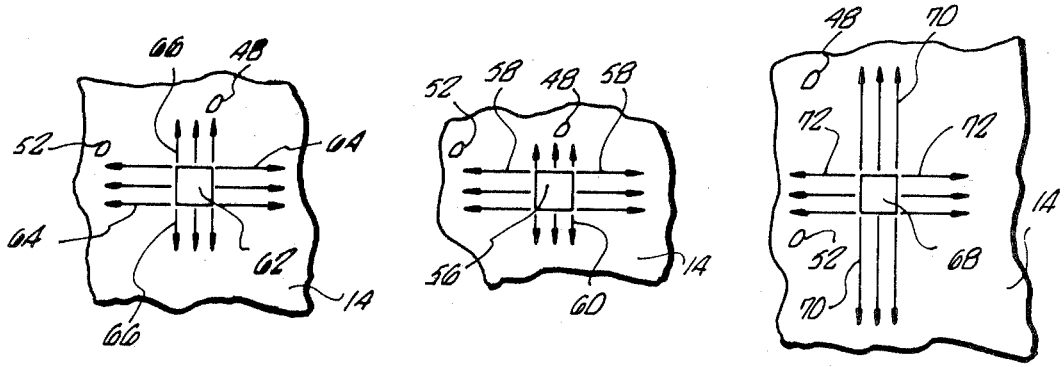
FIG. 6 is a fragmentary, schematic view of the stresses in a portion of the sheet which is adjacent a clamp.
FIG. 7 is a fragmentary view similar to FIG. 6 of another such portion.
FIG. 8 is a fragmentary view similar to FIG. 6 of another such portion of the sheet.

Similarly, point 62 has a stress distribution wherein stresses from the forces of clamp 54, indicated by arrows 64 in FIG. 7, are greater than stresses from forces of clamp 50 indicated by arrows 66. However, the difference is less pronounced than in the case of point 56. Thus, the difference in elongation in the two directions is also less, reducing the unevenness of the sheet's surfaces and its optical distortiveness.

Point 68 is located in the vicinity of clamp 50 closely adjacent its inner side 38. Stresses are unequally distributed, as shown in FIG. 8. Stresses in a cross section perpendicular to lines 48 are represented by arrows 70. They are substantially greater than the stresses 72 in a cross section perpendicular to lines 52. The inequality of the stresses from the clamps again results in unevenness of the sheet's surface which makes it optically distortive and unusable.

Figure 9:
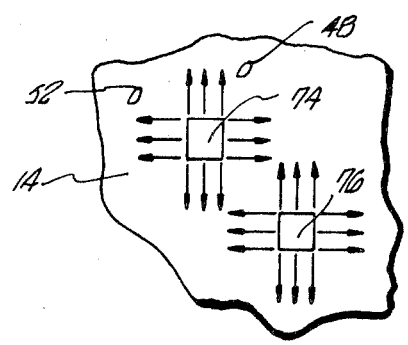
FIG. 9 is a fragmentary view showing diagrammatically the stresses of two portions of the sheet being stretched which are further removed from the clamps toward the center of the sheet.

Optical distortions and physical unevenness disappear in those areas of the sheet where the stresses at any given point become equal, or nearly so, in all directions. At points 74 and 76 the forces, and therefore the stresses, in cross sections transverse to lines 48 and 52 are approximately equal as illustrated in FIG. 9. These points are located within the first zone 34 in which an optically flat sheet is being stretched. The stresses in the direction of both force lines 48 and 52 are substantially equal in this area and the sheet elongates equally in all directions.

It has been determined that the distance between the inner sides 38 of the clamps and the border between the first and second zones 34 and 36 is directly related to the spacing 78 between adjacent clamps. The total stresses at any point in a sheet subjected to plane stresses from a pair of perpendicular forces is made up of two components. Referring to FIGS. 5–9, these components are more conveniently expressed as $\sigma 48$ and $\sigma 52$. At a sufficient distance from the points where the clamps are applied these stresses will be equal to each other when equal strains are applied in both directions. In such places both may be represented by the symbol $\sigma$. The ratio $\sigma 48 - \sigma 52/\sigma$ is a measure of the inhomogeneity of the stress at any particular point. When the stresses are homogeneous, the ratio is equal to zero.

It has been discovered that the stretched sheet is optically satisfactory in areas where this ratio is between zero and about 0.35. Thus, if the sheet must be optically nondistortive, portions of the sheet are satisfactory even if the stresses are not substantially equal, as long as their disparity is not too large. It is therefore desirable to equalize the forces from each clamp over its full effective width as quickly as possible. Mathematical calculations based on the above expression $\sigma 48 - \sigma 52/\sigma$ have shown that the ratio falls below about 0.35 at a distance from the inner side 38 of the clamp of about 50 to 60 percent of the distance 78 between them. Portions of the sheet closer to the center 24 than about 60 percent of the spacing between the clamps are therefore usable. Thus, it is desirable to reduce the spacing between the clamps to increase the yield of optically satisfactory stretched sheets. The ratio of the clamp width to the spacing between clamps must be small enough to permit the material between the clamps to stretch without developing stress concentrations that tend to rupture the material.

Figure 10:
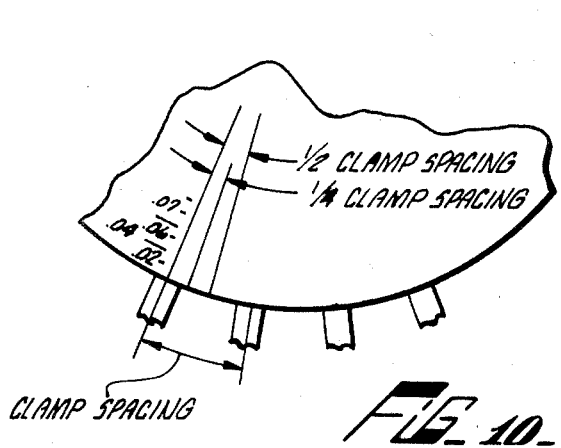
FIG. 10 is a schematic plan view of a portion of a circular disc which is being stretched by a plurality of spaced-apart clamps.

The relation between the clamp spacing and the width of the unusable second zone 36 can be further illustrated by the following theoretical example which is illustrated in FIG. 10. A circular blank of 1-inch radius was assumed to have clamp forces applied exactly at its edge and provided with 24 and 72 equally spaced clamps, respectively. The spacing in the first instance is 0.26 inches and in the second instance 0.087 inches. Table 1 below lists the ratio $\sigma x - \sigma y/\sigma$ for the 24 clamp arrangement and table 2 for the 72 clamp arrangement. Both tables in addition show the same ratio at locations offset one-quarter and one-half the spacing between clamps in a direction transverse to the direction of the force from the clamps.

TABLE 1

| Distance from periphery in inches | $(\sigma x - \sigma y)/\sigma$ | | |
|---|---|---|---|
| | Distance from center 0 | ¼ clamp spacing | ½ of clamp clamp spacing |
| 0 | — | 0 | 0 |

| 0.02 | 8.25 | −0.78 | −0.47 |
| 0.04 | 3.93 | −0.88 | −0.81 |
| 0.06 | 2.39 | −0.59 | −0.96 |
| 0.08 | 1.57 | −0.31 | −0.92 |
| 0.10 | 1.06 | −0.14 | −0.77 |
| 0.12 | 0.72 | −0.06 | −0.6 |
| 0.14 | 0.47 | −0.02 | −0.43 |
| 0.16 | 0.32 | −0.01 | −0.3 |
| 0.18 | 0.2 | 0 | −0.2 |
| 0.20 | 0.12 | 0 | −0.12 |
| 0.22 | 0.08 | 0 | −0.07 |
| 0.24 | 0.05 | 0 | −0.05 |

TABLE 2

| Distance from periphery in inches | $(\sigma x - \sigma y)/\sigma$ | |
|---|---|---|
| | Distance from center | of clamp |
| 0 | — | 0 | 0 |
| 0.02 | 2.36 | −0.58 | −0.91 |
| 0.04 | 0.72 | −0.07 | −0.58 |
| 0.06 | 0.23 | 0 | −0.21 |
| 0.08 | 0.07 | 0 | −0.07 |
| 0.10 | 0.02 | 0 | −0.02 |
| 0.12 | 0 | 0 | 0 |

Table 1 shows that the parameter falls below about 0.35 at a distance from the edge of the disc. This is almost exactly 60 percent when the center spacing between the clamps is 0.26. From table 2 it can be seen that in a disc provided with 72 clamps the stress ratio of 0.35 is also reached at a distance (0.05 inch) from the edge of the disc which is equal to about 60 percent the spacing (0.087 inch) between clamps.

Since the clamps in any one bank move with respect to adjacent clamps, a minimum spacing between the clamps must be maintained to prevent tearing of the sheet. The area covered by the gripping portions 26 and 28 of the clamps must be considered as not stretching at all. Elongation takes place in the portions of the sheet between adjacent clamps. If the sides of the sheet are elongated by two-thirds, the thickness of the sheet in the first zone 34 reduces by a factor of about 2.8. The space between the clamps should be such that the portions of the sheet there are reduced in thickness by a factor not exceeding that by which the center portion is reduced. If the sides are elongated by two-thirds, the free spacing between the clamps should be not less than 45 percent of the clamp spacing 78. The factor by which that portion is deformed is then about equal to the factor by which the center portions of the sheet are deformed. Tearing of the portions of the sheet between the clamps is thereby minimized. At the same time this sets a maximum for the width of the gripping portions 26 and 28. In this particular example the maximum width of the gripping portions is 55 percent of the center distance 78. The area of the gripping portions is determined by the amount of force that must be applied to stretch the sheet. The area used is about 1 square inch per 1,000 pounds of stretching force in a typical application of this invention.

Although it is desirable to increase the number of clamps per unit length to reduce the amount of waste, increased cost of adding additional clamps must be a limiting factor in some applications of this invention.

As a practical example showing the advantages of this invention, a prior art stretching apparatus for stretching 72-inch square, translucent plastic blanks and elongating sides of the blank by about two-thirds is compared with an apparatus constructed in accordance with the present invention.

The prior art apparatus is provided with 32 clamps equally spaced along the periphery of the blank to be stretched while the stretching apparatus of this invention employs 96 clamps. The center spacing 78 of the clamps in the prior art device is 7.7 inches prior to the commencement of the stretching operation while the center spacing in the apparatus of this invention is only 2.84 inches. This results in an increase of the usable area of the stretched sheet from about 56 percent to about 82 percent, or a reduction in the waste from about 44 percent to about 18 percent. This is a factor of almost 2½.

Referring to FIG. 11, the relationship between the clamp spacing 78 and the percentage of waste of the sheet which must be discarded after its has been stretched is shown. At a 9.8-inch spacing, which corresponds to 24 clamps on a blank having 72-inch sides, the waste is about 55 percent. At a 5.2 spacing, the waste still amounts to over 30 percent. By reducing the clamp spacing to below 5 inches prior to the commencement of the stretching operation, the waste is less than 30 percent and the usable area is more than 70 percent of the total area of the sheet. The waste is about 14 percent at a spacing of 2.3 inches which corresponds to about 120 clamps on a square blank having 72-inch sides. Further reductions in the spacing have only a slight effect on the yield of satisfactorily stretched material. Adding more clamps becomes economically unsound, technically difficult and, under normal circumstances, undesirable. A spacing between clamps of 2 to 3 inches is the optimum for typical acrylic stretching operations. In the preferred arrangement, the spacing of the clamps with respect to one another should be sufficiently close to provide a stress factor not exceeding 0.35 over approximately 80 percent of the total area of the sheet.

What is claimed is:

1. In apparatus for stretching sheet material which comprises a plurality of clamps equally spaced from one another along the periphery of the sheet material for gripping the sheet material at locations around the area of the sheet material to be stretched, and means for moving the clamps collectively from a first relatively closer position prior to a stretching operation to a second relatively farther position after a stretching operation for stretching sheet material, the improvement comprising means for spacing the clamps with respect to one another in the first position a distance which provides a stress factor in the sheet not exceeding 0.35 over at least 80 percent of the area of the sheet material at all clamp positions between the first position and the second position.

2. In apparatus for stretching acrylic sheet material which comprises a plurality of clamps equally spaced about the area in which the sheet material is located and having clamping pads for frictionally engaging the sheet material at locations spaced inwardly from the outer periphery of the sheet material, and means for moving the clamps collectively from a first relatively closer position prior to a stretching operation to a second relatively farther position after a stretching operation for stretching sheet material, the improvement comprising means for spacing the clamping pads with a free space therebetween at least enough to provide a reduction in thickness of the sheet material between adjacent clamps during the stretching operation which is no more than the reduction in thickness of the middle portions of the sheet.

3. The apparatus of claim 2 wherein the width of the respective clamping pads is not more than 55 percent of the distance between the centers of adjacent clamping pads in the first position along any line disposed parallel to the edge of the sheet to be stretched and passing under the respective pads.

4. In apparatus for stretching plastic sheet material which has been preheated, the improvement which comprises:
   a. pairs of opposed corner clamping pads for engaging the sheet material at the corners,
      the corner clamping pads applying forces to the sheet material along perpendicular directions extending parallel to the corner edges of the sheet, and
   b. a plurality of pairs of opposed clamping pads equally spaced along the edges of the sheet material between the corner clamps,
      the respective pairs of opposed clamping pads being operable to frictionally engage the preheated sheet material with regions elongated along the direction that force is to be applied to the sheet material and grip it without requiring the application of additional heat through the pads.

5. The apparatus of claim 4 wherein the corner clamping pads are pie-shaped and have two sides that are perpendicular to one another and a curved third side.

6. An apparatus as defined in claim 4 wherein the width of the respective opposed clamping pads is not more than 55 percent of the distance between the centers of adjacent opposed clamping pads along any line parallel to the edge of the sheet material and passing under the respective pads.

7. An apparatus as defined in claim 6 further comprising:
means for moving the clamping pads collectively from a first relatively closer position prior to a stretching operation to a second relatively further position after a stretching operation for stretching sheet material; and
means for spacing the clamping pads with respect to one another in the first position a distance which provides a stress factor in the sheet not exceeding 0.35 over at least 80 percent of the area of the sheet material at all clamp positions between the first position and the second position.

8. An apparatus as defined in claim 1 wherein the portions of the clamps in contact with the sheet material are elongated along the direction that force is to be applied to the sheet material.

9. An apparatus as defined in claim 2 wherein the clamping pads are elongated along the direction that force is to be applied to the sheet material.

10. An apparatus as defined in claim 3 wherein the clamping pads are elongated along the direction that force is to be applied to the sheet material.

* * * * *

PO-1050
(5/69)

UNITED STATES PATENT OFFICE
CERTIFICATE OF CORRECTION

Patent No. 3,635,640      Dated January 18, 1972

Inventor(s) Edward C. Wood

It is certified that error appears in the above-identified patent and that said Letters Patent are hereby corrected as shown below:

Col. 1, line 12 - Ser. No. 168,368 should be 768,368

Col. 2, line 42 - "or" should be "on"

Col. 3, line 21 - "of" (1st occurrence) should be "or"

Col. 3, line 54 - "to" (2nd occurrence) should be "of"

Col. 3, line 58 - "it" should be "that"

Col. 5, line 27 - After "distance" insert "of 0.16"

Col. 5, line 59 - "must" should be "may"

Signed and sealed this 18th day of July 1972.

(SEAL)
Attest:

EDWARD M. FLETCHER, JR.
Attesting Officer

ROBERT GOTTSCHALK
Commissioner of Patents